United States Patent [19]
Diaz

[11] 3,955,596
[45] May 11, 1976

[54] SEWER PEST CONTROL CHECK VALVE

[76] Inventor: Benigno Diaz, 6595 SW. 31st St., Miami, Fla. 33155

[22] Filed: Sept. 10, 1973

[21] Appl. No.: 396,071

[52] U.S. Cl. .................................. 137/527; 137/550
[51] Int. Cl.² ..................................... F16K 15/03
[58] Field of Search .............. 137/550, 547, 527.8, 137/527.4, 527, 527.2, 527.6, 546.9, 549, 544; 251/300, 302, 301, 327, 328, 329; 210/123, 131

[56] References Cited
UNITED STATES PATENTS

| | | | |
|---|---|---|---|
| 891,012 | 6/1908 | Shepard | 137/527.6;527.6 X |
| 1,354,879 | 10/1920 | Boland | 137/389;527 X |
| 1,786,597 | 12/1930 | Boosey | 137/605;527.6 X |
| 2,718,238 | 9/1955 | Simko, Sr. | 137/527.2 |
| 2,925,825 | 2/1960 | Staiger | 137/514;527.8 X |
| 3,720,225 | 3/1973 | Wheatley, Jr. | 137/268;527.8 X |

*Primary Examiner*—Martin P. Schwadron
*Assistant Examiner*—Robert J. Miller
*Attorney, Agent, or Firm*—Erwin M. Barnett

[57] ABSTRACT

A sewer pipe valve section comprising a removable one-way check valve and a separate removable screen is provided to be interposed between the building sewer drain system and that of the city. A linkage retains the screen in a normally raised inoperative position when the one-way check valve is in a lowered operative position and permits the screen to be lowered into operative position when the check valve is raised and removed for cleaning the pipe.

4 Claims, 11 Drawing Figures

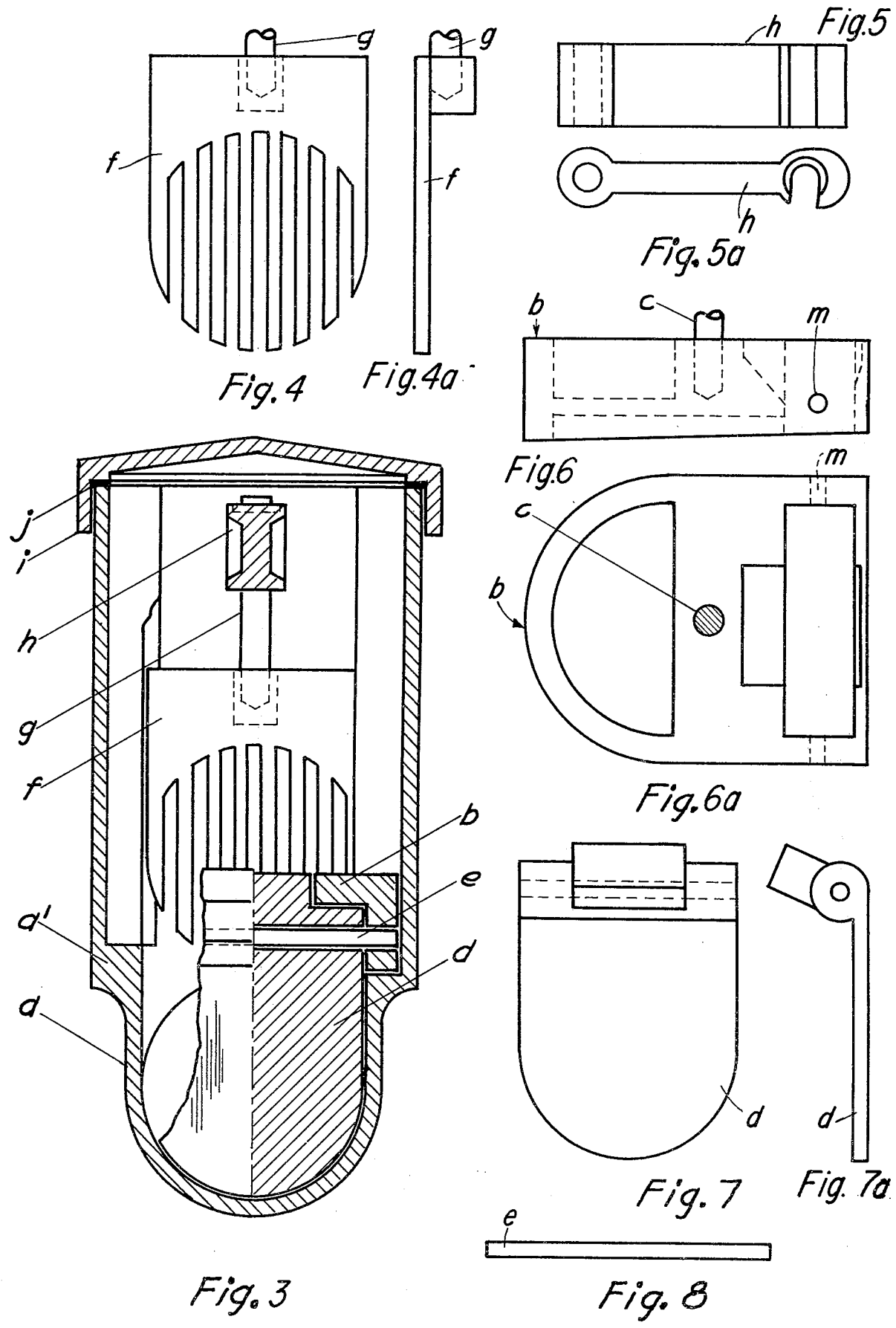

SEWER PEST CONTROL CHECK VALVE

BRIEF SUMMARY OF THE INVENTION

The sewer pest control check valve unit is a one way check valve to be added to the residential sewer system at its connection to the city sewer system.

The purpose of the check valve unit is to prevent the passage of pests, such as rats, mice, frogs, snakes, etc., into residences through residential water closets. It also prevents the stoppage of sewer flows, caused by pests that get stuck in them.

The check valve unit is mechnically actuated by means of a counterweight balanced pendulum-like valve which effectively closes the sewer pipe when not in use, thus preventing the passage of any pest. When the sewer flows, the water pressure lifts the pendulum-like valve.

The check valve unit is designed so that it will not affect the normal flow of sewage.

The check valve unit can be removed easily and quickly for inspection and/or cleaning. It does not obstruct, in any way, the operation of current sewer cleaning equipment.

The check valve unit consists of a one piece body, formed by a horizontal pipe and a vertical box.

The horizontal pipe is used for the flow of sewage, thus it forms part of the sewer system.

The vertical box rises from the upper side of this pipe; the box is centered on the pipe.

At the bottom of the vertical box, and inside it, in the junction with the horizontal pipe, there is a support with a pendulum-like valve. There is also a screen for temporary use when the pendulum-like valve is removed.

This support keeps the pendulum-like valve in its normal operating position.

The support has a rod attached to it, so that it can be removed through the vertical box opening, which should be at grade level.

On the upper end of the support rod there is a link which holds the temporary screen when it is not being used.

The temporary screen is dropped from the vertical box into its position in the horizontal pipe through a slot. The temporary screen has a rod which facilitates its placing in position and removing it when the pendulum-like valve is returned to its normal operating position.

There is a cover, with a flange, to cover the vertical box opening at grade level. Through this opening access to the interior of the check valve unit can be gained.

All the different parts of the check valve unit can be made of outdoor RS (Rubber Styrene) or PVC (Polyvinyl Chloride) plastic. The shaft of the valve must be a non-corrosive metal.

The various parts of the check valve unit may be made of metal and plastic materials to comply with local building and sanitary codes.

BRIEF DESCRIPTION OF THE DRAWINGS

FIG. 3 is a transverse vertical section taken on lines 3—3 in FIG. 2.

FIG. 4 is a front elevational view of the lowerable screen removed from the assembly.

FIG. 4a is a side elevational view of the screen shown in FIG. 4.

FIG. 5 is a front elevational view of the disengageable arm support between the valve support and screen rods removed from the assembly.

FIG. 5a is a top plan view of the arm support shown in FIG. 5.

FIG. 6 is a side elevational view of the support plate for the pendulum-like valve removed from the assembly.

FIG. 6a is a top plan view of the support plate shown in FIG. 6.

FIG. 7 is a front elevational view of the pendulum-like valve removed from the assembly.

FIG. 7a is a side elevational view of the pendulum-like valve shown in FIG. 7, and FIG. 8 is a plan view of the shaft of the pendulum-like valve removed from the assembly.

DESCRIPTION OF THE PREFERRED EMBODIMENT

The control check valve unit embodying the invention is formed as a unitary body comprising a horizontal pipe section ($a$) and a vertically extending box section ($a^1$). Pipe section ($a$) will function as part of the sewer pipe of the system into which it is installed. The size of the ends of pipe section ($a$) will be adapted to the size of existing sewer pipes specifications.

Box section ($a^1$) serves to lodge and support the pendulum-like valve ($d$) in its support plate ($b$), and the temporary screen ($f$). The length of box section ($a^1$) will be such that its top will be at grade level.

Inside box section ($a^1$) and along it are the grooves which will serve as guides to place and remove the pendulum-like valve, in its support ($b$), and the temporary screen ($f$). Or the upper side of the horizontal pipe ($a$), at the intersection with the vertical box ($a^1$) there is an opening and seat for the removable support plate ($b$) for the pendulum-like valve ($d$). Next to this opening and seat, there is the slot through which the temporary screen ($f$) is introduced, when it is in use, during the cleaning and/or inspection process of the pendulum-like valve ($d$).

Figure 1:
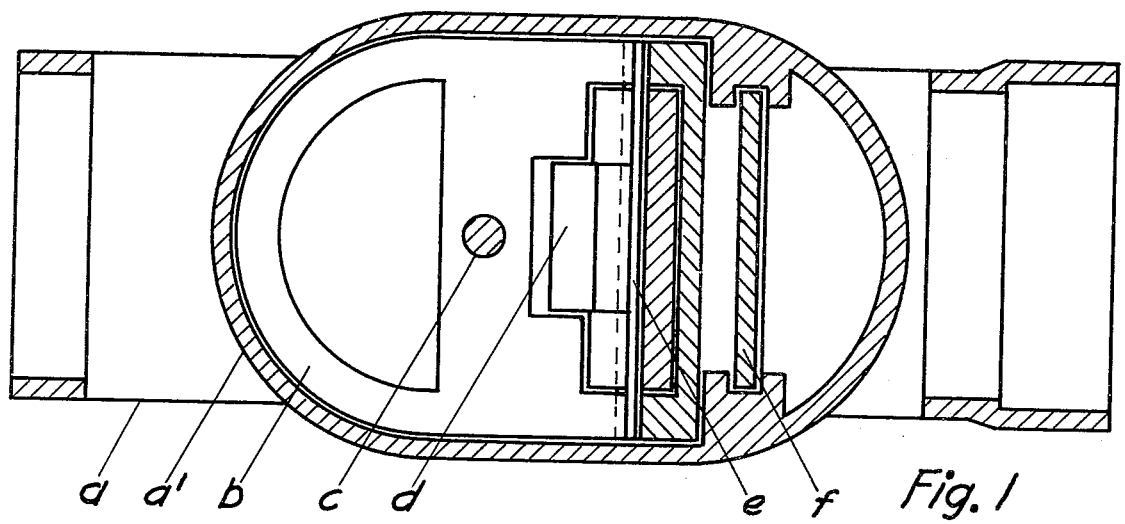
FIG. 1 is a sectional view taken on line 1—1 in FIG. 2.

As is clear from FIGS. 1, 6 and 6a, support plate ($b$) is semicircular at one end and rectangular at its opposite end. Its thickness will be such that it allows a lodgement area ($k$) in its lower part to lodge the pendulum-like valve ($d$) so it does not obstruct the horizontal pipe ($a$). In the rectangular end of plate ($b$) is the slot to lodge the pendulum-like valve ($d$) which is supported by the shaft ($e$) that goes through the drilled holes ($m$) at either side of the support plate ($b$). This slot lodges the counterweight of the pendulum-like valve ($d$), at the same time it serves to stop the travel of the valve ($d$) by the counterweight. It also facilitates the correct positioning for the pendulum-like valve ($d$) when the valve is placed, together with the support plate ($b$) in the vertical box section ($a^1$).

A vertical rod ($c$) is mounted to upstand from approximately the center of support plate ($b$) and is used as a handle to remove and replace the support plate ($b$) together with the pendulum-like valve ($d$) in its seat inside the vertical box section ($a^1$). The length of rod ($c$) length is such that its upper end reaches grade level and is also used to mount disengageable arm support (*h*) for the temporary screen (*f*).

The pendulum-like valve (*d*) has a semicircular end so that it closes tightly against the horizontal pipe (*a*) when sewage is not flowing and thus prevents the passage of pests. The upper end of valve (*d*) has a perforated cylinder that accommodates shaft (*e*). To this cylinder a counterweight is attached. This counterweight also serves to limit the pendulum-like valve (*d*) travel, when the valve is in its normal operating position.

Temporary screen (*f*) is semicircular at its lower end, formed by a set of rods, and rectangular at its upper end. It is placed in the guide inside the vertical box ($a^1$) and through the slot in the upper side of the horizontal pipe (*a*). The temporary screen (*f*) covers the horizontal pipe's (*a*) opening, in the direction of sewage flow completely, when placed in the position for temporary use.

The purpose of this screen (*f*) is to block pests passage when pendulum-like valve (*d*) is removed for inspection or cleaning.

Shaft (*e*) swingably suspends the valve (*d*) in its support plate (*b*). It is cylindrical in shape and is of such a diameter as to allow free play for the pendulum-like valve movement. Shaft (*e*) is sized to extend into holes (*m*) drilled in opposite sides of support plate (*b*). When the support plate (*b*) and the pendulum-like valve (*d*) are placed in the vertical box section ($a^1$) the side wall of the box limits the lateral movement of the shaft (*e*).

A temporary screen rod (*g*) is attached to the upper end of the temporary screen (*f*) in vertical position. It is of such length that it will be accessible from grade level. At the upper end of this rod (*g*) is a flange for engagement by arm support (*h*), when the screen is not in use. This rod (*g*) is also used as a handle to slide the screen (*f*) along the grooves in the vertical box section ($a^1$), through the slot and into operative position in the horizontal pipe section (*a*).

Figure 2:
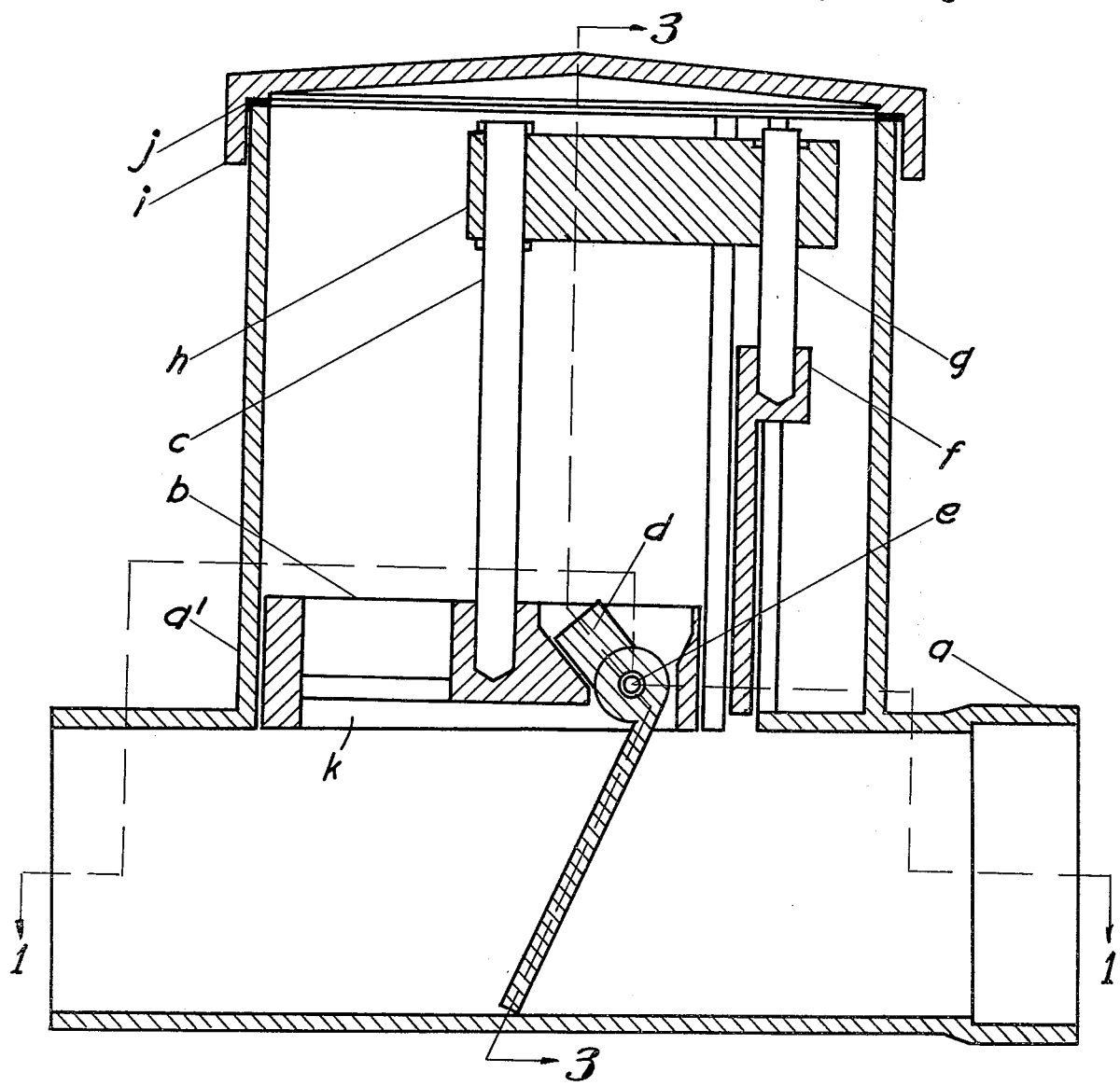
FIG. 2 is a vertical section taken longitudinally through the sewer pipe valve section constructed to embody the invention.

Temporary screen (*f*) is supported in raised position by arm support (*h*) which is pivotally attached to the upper end of vertical rod (*c*) between a pair of flanges as is clear from FIG. 2. In this way the temporary screen (*f*) can be secured in raised position out of the horizontal pipe section (*a*) or released for positioning inside the latter for temporary use.

The support plate (*b*) and the pendulum-like valve (*d*) can be removed when the arm support (*h*) is pivoted free of the rod (*g*) letting the temporary screen (*f*) free for lowering into operative position.

The cover of the vertical box section ($a^1$) will be oval in shape. It will have a flange to keep it in position, covering the top opening of the vertical box section ($a^1$). Inside the cover (*i*) there will be an appropriate edge to let the cover rest in place. This edge will have a gasket (*j*).

The gasket will be oval in shape and it will be placed between the cover (*i*) and the top edge of the vertical box section ($a^1$). This gasket will prevent the passage of the sewer odors to the exterior.

All the different parts of the control check valve unit can be made of outdoor RS (Rubber Stylene) or PVC (Polyvinyl Chloride) plastics. The shaft of the valve must be of a non-corrosive metal.

To comply with some local codes, the horizontal pipe section (*a*) and the vertical box section ($a^1$) must be of casting iron. The inside parts may be made of RS or PVC plastic. The shaft of the valve must be of a non-corrosive metal.

The operation of the sewer pest control check valve unit or pipe section when placed between a residential drain system and the city sewer system will now be apparent. The flow of wast material (through the pipe valve section from right to left in FIGS. 1 and 2) will pivot valve (*d*) in a clockwise direction as seen in FIG. 2. In the absence of forward flowing sewage or when backup occurs, valve (*d*) closes to achieve the intended results of preventing undesirable pests from entering the drainage system of the building.

To provide temporary protection against entrance of such pests when valve (*d*) is removed for cleaning as by the removal of cover (*j*) from the top of box section ($a^1$), which forms the housing for valve support or frame (*b*), for access to arm support or hook (*h*) whereby pivoting the latter on vertical rod (*c*) disengages rod (*g*), screen (*f*) is permitted to slide along the aligned vertical tracks formed in said box section housing into position across the bore of horizontal pipe portion or section (*a*) and then by grasping said arm (*h*) or rod (*c*), valve support plate or frame (*b*) with valve (*d*) is vertically raised and completely removed from the pipe unit. After cleaning horizontal pipe portion (*a*) and the drainage pipe downstream thereof in the well understood manner, frame (*b*) with valve (*d*) is replaced in position on its seat at the bottom of housing ($a^1$) and temporary screen (*f*) is raised by grasping its rod (*g*) and is then secured in raised position by pivoting arm support (*h*) so that its hooked end engages the upper end of rog (*g*). Cover (*i*) may then be replaced to complete the cleaning of the drain.

I claim:

1. A sewer pipe valve section having a pipe portion formed with opposite circular ends for interconnecting with adjacent pipe sections, a housing extending upwardly from a midportion of said pipe portion having an open top fitted with a removable cover and an interior shoulder at a lower end thereof, a valve support frame resting on said shoulder and movable vertically for removal through said open top, a one-way flapper valve pivotally mounted on a horizontal axis in said frame to depend therefrom into said pipe portion to swing from a normally closed position obstructing a reverse flow of sewage material to an open position responsive to the flow of material downstream toward a sewer outlet, a rod upstanding from said frame, a screen spaced upstream of said valve mounted in said housing for vertical movement from a normally raised inoperative position within the housing to a lowered operative position in said pipe portion, and disengageable linkage means coacting between said rod and said screen to secure said screen in said raised inoperative position when said frame is resting on said shoulder and to be disengaged to release said screen for lowering into said operative position when said frame and valve are removed for cleaning the pipe.

2. The pipe valve section defined in claim 1 in which said linkage means includes a second rod upstanding from a top edge of said screen and a hook pivoted to the upper end of said first mentioned rod to releasably engage an upper end of said second rod for said rod and screen coaction.

3. The pipe valve section defined in claim 1 in which said housing has opposite wall portions formed with aligned vertical tracks in which said screen is mounted for said vertical movement.

4. The pipe valve section defined in claim 3 in which said tracks and screen divide the interior of said housing into chambers of greater and lesser cross-sectional area, said frame occupying the greater chamber for access to said pipe portion downstream of said screen when the frame and valve are removed for said pipe cleaning.

* * * * *